No. 607,329. Patented July 12, 1898.
W. H. BEEBE.
TRUCK.
(Application filed Oct. 1, 1897.)
(No Model.) 2 Sheets—Sheet 2.
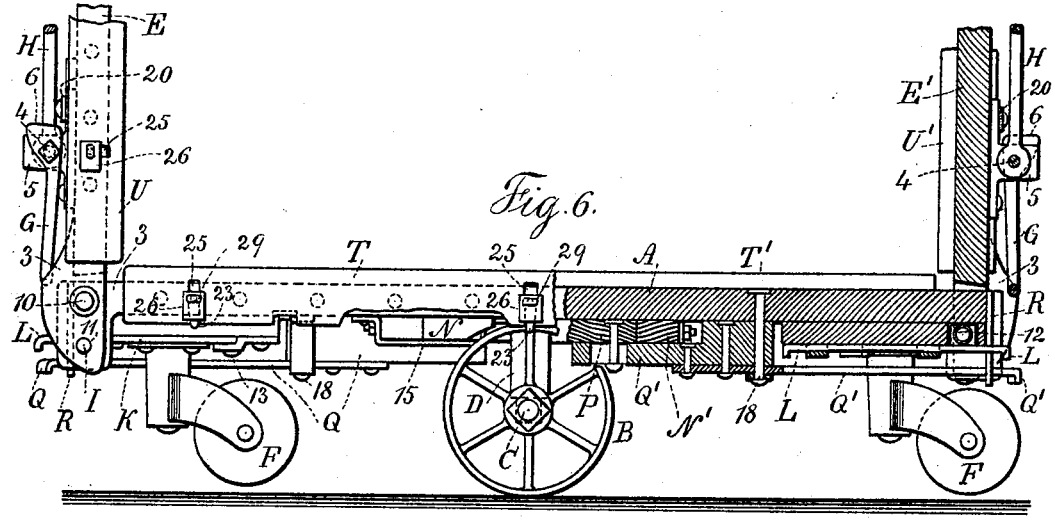
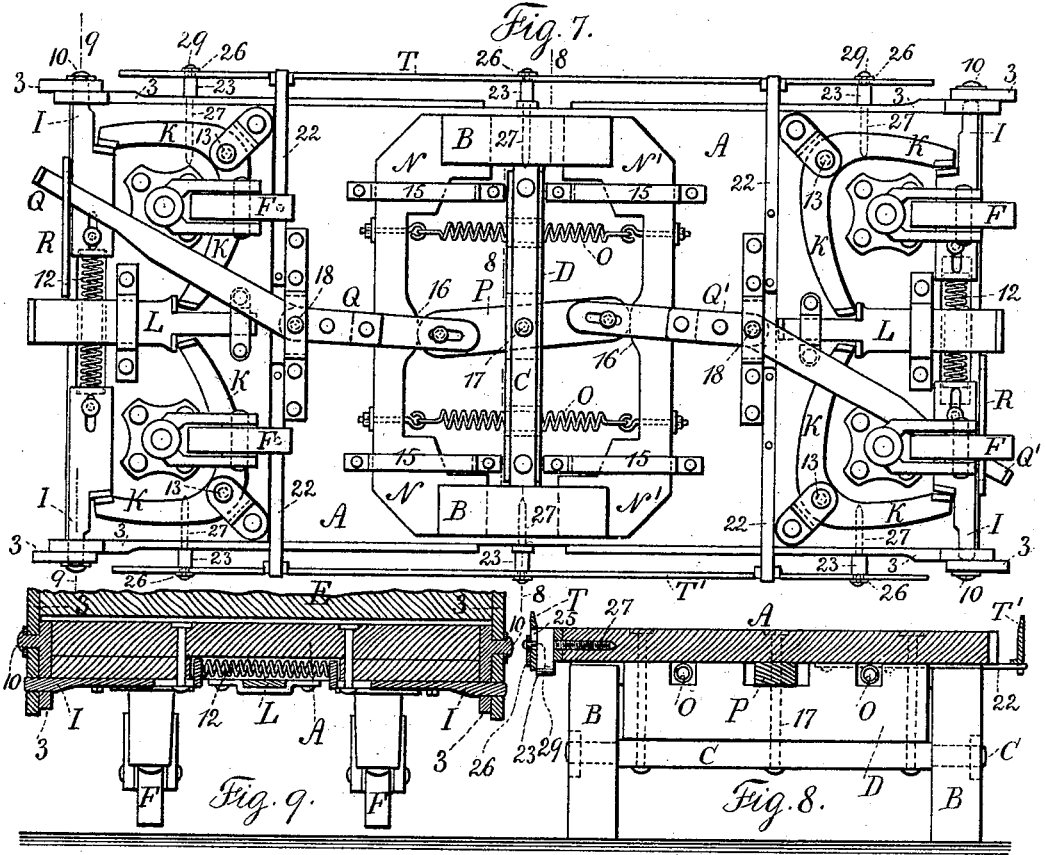
Witnesses:
J. Staib
Chas. H. Smith
Inventor:
Walter H. Beebe
per L. W. Serrell & Son
Attys

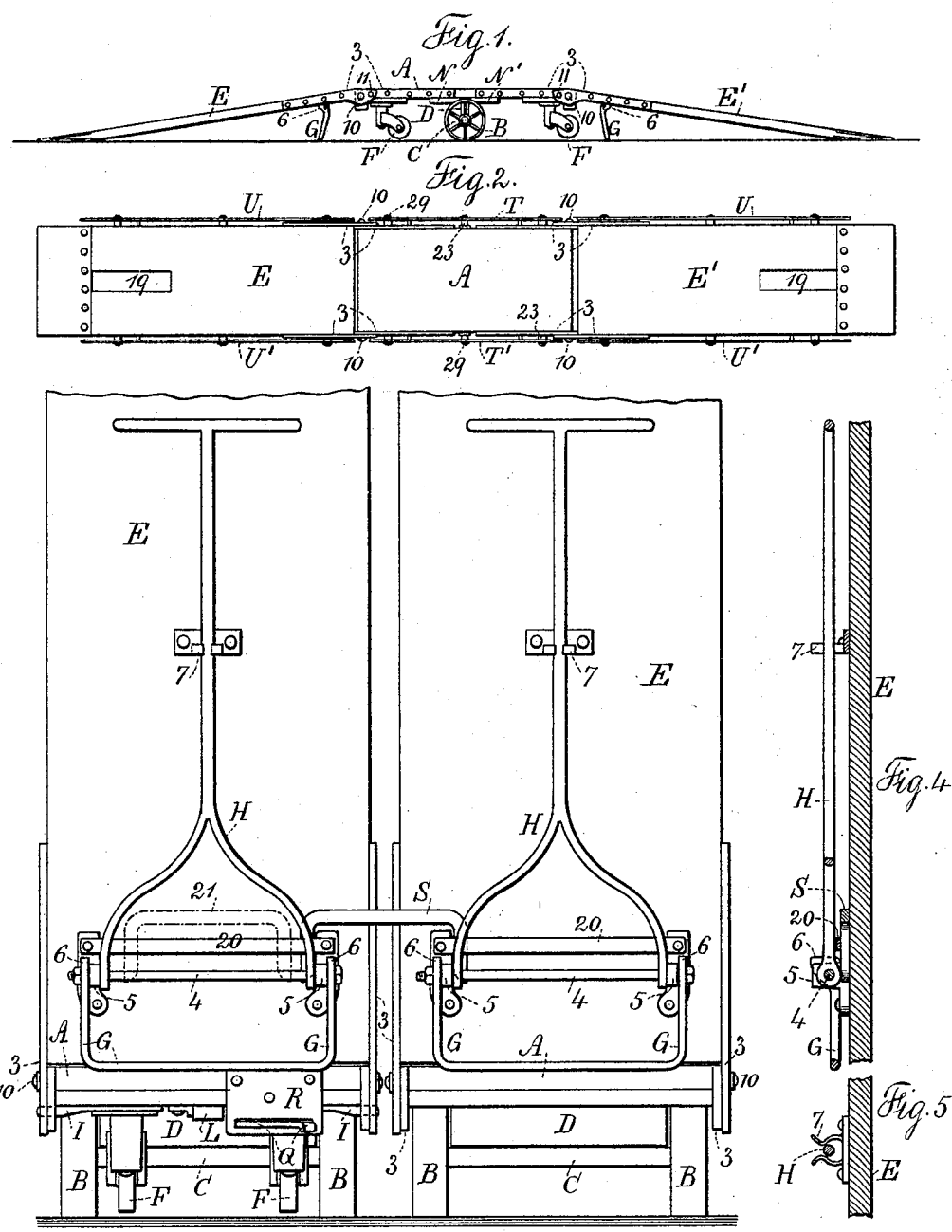

UNITED STATES PATENT OFFICE.

WALTER H. BEEBE, OF NEW YORK, N. Y.

TRUCK.

SPECIFICATION forming part of Letters Patent No. 607,329, dated July 12, 1898.

Application filed October 1, 1897. Serial No. 653,678. (No model.)

*To all whom it may concern:*

Be it known that I, WALTER H. BEEBE, a citizen of the United States, residing at the city of New York, in the county and State of New York, have invented an Improvement in Warehouse-Trucks, of which the following is a specification.

In storing goods in warehouses it is usual to receive the boxes, bales, or other articles upon a truck from the cart and to roll the truck into the warehouse; but in the modern warehouses containing several floors elevators are provided for raising the goods to the desired floor, and heretofore the goods have been deposited from the hand-truck upon the elevator, raised to the proper height, and taken off the elevator by another hand-truck. This involves considerable handling, especially where comparatively small boxes, bundles, or similar articles have to be stored, and a similar amount of handling is necessary when the goods are delivered from the warehouse.

In addition to the foregoing where the warehouses are closely packed with the goods the passage-ways that are left are seldom wide enough for two trucks to pass each other and delays arise, especially on long floors, because one truck cannot be entered through the passage-way or aisle until free from a truck coming in the opposite direction.

The object of the present invention is to provide a truck that is adapted to receive the goods from a wagon upon the street and into which truck the goods can be packed closely, and such truck is then to be rolled to an elevator and received thereon and raised to the floor where the goods are to be deposited, and then such truck, with its contents, is to be rolled off the elevator to the place where the goods are to be removed from the truck and stored.

In order to adapt the improved truck to the various conditions under which it is used, I provide a central platform and hinged ends that can be turned up and locked to form ends to the truck, between which the goods are packed, and which when unlocked can be swung down and form inclines at the ends of the truck, so that in a passage-way or aisle an empty truck coming in one direction can instantly have the ends swung down to the floor to form inclines over which a full truck coming in the other direction can be drawn with facility.

I provide a pair of supporting-wheels for the truck and a brake mechanism therefor by which the wheels can be instantly clamped, so that there is no risk of the truck changing its position while being carried up on an elevator, and I provide a handle at each end adapted to being held beneath the hinged end of the truck and by which the truck can be easily drawn or pushed, and a swinging leg is provided upon each swinging end of the truck near the hinge thereof which automatically turns down into position to support the ends of the truck-platform while another truck is being drawn over the same, and the locking-bolts which hold the truck ends up vertical are actuated in one direction by springs, so as to hold the truck ends when swung up vertically, or they are unbolted in the opposite direction by the action of a lever moved by the foot, and the truck is constructed in such a manner that where advantageous two trucks can be coupled together for receiving and moving larger articles than those to which one truck might be adapted, and in this way two trucks can be run together upon an elevator or run off and moved together to any desired place.

In the drawings, Figure 1 is a side view illustrating on a small scale the entire truck with the ends turned down into inclined positions, and Fig. 2 is a plan view of the same. Fig. 3 is an end view of two trucks coupled together. Fig. 4 is a section of the handle and leg and part of the truck end. Fig. 5 is a detached sectional plan view showing the clip for the handle. Fig. 6 is a side elevation and partial section in larger size, showing the lower portions of the truck ends as turned up. Fig. 7 is an inverted plan view of the center portion of a truck. Fig. 8 is a section at the line 8 8, Fig. 7; and Fig. 9 is a section at the line 9 9, Fig. 7.

The platform A is of any desired size and shape, and the pair of wheels B are upon a shaft or axle C, that crosses beneath the middle part of the platform, and there is a bolster D or other support from the axle C to the under side of the platform, and suitable bolts are used to unite the parts. The top surfaces of the wheels are advantageously closely adjacent to the under side of the platform, so that the platform is not elevated from the floor or pavement more than necessary.

The platform ends E E' correspond in width, or nearly so, to the platform A, and they are united to the platform by the hinges 3, such hinges being made as straps bolted to the edges of the platform and platform ends and being sufficiently large to obtain the necessary strength. These platform ends E E' can be turned down into the inclined positions shown in Fig. 1 or swung up vertically, as illustrated in Fig. 6.

As trucks of this character frequently have to sustain heavy weights and at the same time be capable of being turned around in a comparatively small space, it is advantageous to make use or caster-wheels F. I have shown and prefer to use four of such caster-wheels closely adjacent to and beneath the corners of the platform A, and these caster-wheels can turn in any desired direction as the platform may be swung around, and the wheels B should receive the principal part of the weight, their bottom edges being at a slightly-lower level than the bottom edges of the caster-wheels, and in order to sustain the platform ends when turned down to form inclines, as in Fig. 1, the legs G are made use of, such legs being preferably in the form of bars with right-angled ends, as seen in Fig. 3, through which ends the pivot-bolt 4 passes, which bolt connects such legs G with the brackets 5 upon the under surface of the platform end, and these legs have at their outer ends projecting shoulders or stops 6, as seen in Fig. 4, which, coming against the under surface of the platform or against the flange of the bracket, limit the swinging motion of the legs and cause them to retain the position indicated in Fig. 1 when the platform ends are turned down. The pivot-bolt 4 also connects the forked end of the handle H to the brackets 5, so that this handle can be raised or lowered and employed for pulling the truck along from one place to another or for pushing the same, and the handle is preferably made in the shape indicated in Fig. 3, having a cross-bar at the end, and when the handle is swung up against the platform end, as seen in Figs. 3 and 4, it is held in position by being pressed into the spring-loop 7, (seen in plan view in Fig. 5,) and this is sufficient to hold the handle in position when not in use, but the spring-loop allows the handle to be drawn out instantly when required for use.

At 10 the pivots of the hinges 3 are represented, and at 11 are holes through the metal of the hinges for the locking-bolts I. These are suitably supported in bearings at the under side of the platform at each end, and the springs 12 serve to project the ends of the bolts into the holes 11 of the swinging portions of the hinges, so as to lock the platform ends when swung up vertical, and the bent levers K and the central foot-pieces L are used to unbolt the platform ends. The bent levers K are pivoted at 13, and the foot-pieces L are fitted in supports, so that the foot-piece can be slid endwise with facility by pressure from the foot, and in so doing the bolts I can be withdrawn so as to unlock the platform end and allow it to swing down, and similar devices being provided for both platform ends either one or both can be turned down, and when swung up the bolts I are projected automatically by the springs and hold the platform ends in their vertical positions.

The two brake-bars N N' cross beneath the platform and adjacent to the wheels B, and these brake-bars are free to slide laterally within the loops 15, that are bolted at their ends to the under side of the platform, and the springs O tend to draw the brake-bars against the wheels at their opposite sides, and the ends of these brake-bars are beveled, as indicated in Fig. 6, so that they act like wedges between the platform and the tops of the wheels. Hence when these springs are allowed to act the brake-bars wedge in at opposite sides of the wheels and prevent such wheels turning in either direction, and in order to relieve the brake-bars and liberate the wheels inclines 16 are provided on the inner faces of the brake-bars, and a swinging cam-bar P, pivoted upon the bolt 17, is made use of for its ends to press back the brake-bars by acting upon the inclines 16 and so liberate the brakes, and this cam-bar P is acted upon by any suitable devices, such as the levers Q Q', pivoted at 18, so that the attendant by his foot can press either lever Q or Q' and swing the cam-bar for liberating the brake, or by the reverse movement the springs are allowed to act in applying the brake, and the levers Q Q' advantageously pass near their ends through slotted guide-plates R, one of which is shown in Fig. 3 and by which the extent of movement laterally to the levers Q Q' is determined, and it will be apparent that the brake can be applied or removed from either end of the truck.

It will now be apparent that the truck can be loaded upon the platform portion when both ends are turned down, as indicated in Figs. 1 and 2, or when one or both ends may have been turned up into the position shown in Fig. 6, the loading being effected, if before the ends are turned up, in such a way that the ends can be easily turned up afterward and vertically, so as to be held by the bolts while the truck is being rolled from one place to the other, and while the truck is being unloaded the ends may be held up in place or they may be swung down into the inclined position of Fig. 1, and when one truck may have to pass another truck in a passage-way or aisle that may not be wide enough for both trucks the empty truck is to have the ends swung down to form inclines and the full truck rolled over the empty truck, which can be accomplished with facility.

During the operation of rolling one truck over another truck it will be apparent that the caster-wheels at the advancing end of the truck first pass up one incline, and in so doing the wheels B are lifted off the floor and then they come in contact with the incline as the movement of the full truck progresses across the empty truck. It is therefore important to employ two caster-wheels at each end of the truck to prevent the risk of the truck tipping in entering or leaving the inclines; but should it be deemed advantageous to employ but one caster-wheel at each end a recess or cavity may be formed near the lower end of each incline, as seen at 19, so that a central caster-wheel may pass into such recess and the wheels B will remain upon the floor until they reach the lower end of the incline, and thereby the tendency of the full truck to tip will be prevented.

By providing a staple-bar S of a length to reach from one bracket 5 on one truck to the similar bracket upon the next truck, as indicated in Fig. 3, two trucks may be connected together by a staple-bar at each end, so that they may be moved together from place to place, or they may receive larger articles that require the platforms of two trucks to support them, and by these connecting staple-bars the trucks will be held together, so that they can be drawn from place to place as required. The ends of these staple-bars hook in behind the respective brackets, and it is advantageous to provide cross-bars 20, behind which the ends of the staple-bars are inserted and which cross-bars receive and hold the staple-bars when not in use in the position indicated by dotted lines at 21.

In order to lessen the risk of a full truck running off from the edge of an empty truck that may be spread down, as shown in Fig. 1, side bars T T' may be provided at the edges of the platform A and similar bars U U' at the edges of the swinging ends E E', and these bars should project slightly above the surface of the platform and of the ends, so as to form guides to the wheels of the full truck in running over the empty truck. These side bars may be rigidly connected and project slightly from the edges of the respective parts, as indicated in Fig. 2. I, however, prefer to apply the side bars T T', as illustrated in Figs. 7 and 8—that is to say, the side bars T T' rest upon springs 22, by which such side bars are lifted, so as to project above the top surface of the platform, and which springs will yield to the weight of boxes or other articles of merchandise resting upon the platform, so as not to interfere with the piling of goods upon such platform, and to hold the side bars in place blocks 23 may be provided at the edges of the platform, and bolts or pins 29 pass through the vertical slots 25 in the said side bars, so that the side bars are kept in position; but they are free to be depressed by the action of the load upon the platform, the plate-springs yielding and the slots allowing of the motion upon the connecting pins or bolts, and washers 26 upon the ends of the connecting-bolts may be provided to aid in guiding the side bars as they are moved up or down. The blocks 23 may be secured upon the edges of the platform in any desired manner. I have shown the bolts 27 as passing from them into the platform.

I claim as my invention—

1. The combination with the platform-truck having supporting-wheels, of end pieces, hinges for connecting the end pieces to the platform and upon which such end pieces can be turned down to form inclines at the opposite ends of the platform and bolts for holding the ends when turned up vertically, substantially as set forth.

2. The combination with the platform-truck having supporting-wheels, of end pieces, hinges for connecting the end pieces to the platform and upon which such end pieces can be turned down to form inclines at the opposite ends of the platform, bolts for holding the ends when turned up vertically, and pivoted legs connected with the ends and near the hinges for supporting the end pieces and the platform of the truck when another platform or weight is passed over the truck, substantially as set forth.

3. The combination with the platform-truck having supporting-wheels, of end pieces, hinges for connecting the end pieces to the platform and upon which such end pieces can be turned down to form inclines at the opposite ends of the platform and bolts for holding the ends when turned up vertically, handles hinged to the truck ends and adapted to be turned up closely adjacent to such ends when they are swung down into an inclined position, substantially as set forth.

4. The combination with a platform-truck having supporting-wheels and a brake for the wheels, of end pieces, hinges for connecting the end pieces to the platform and upon which such end pieces can be turned down to form inclines at the opposite ends of the platform, and bolts for holding the ends when turned up vertically, substantially as set forth.

5. The combination with the platform-truck having supporting-wheels, of end pieces, hinges for connecting the end pieces to the platform and upon which such end pieces can be turned down to form inclines at the opposite ends of the platform, bolts for holding the ends when turned up vertically, springs for projecting the bolts and levers and a foot-piece for withdrawing such bolts, substantially as set forth.

6. The combination with a platform-truck and its supporting-wheels, of brake-bars adapted to engage the upper sides of the wheels and to pass in between such wheels and the under side of the platform, and mechanism for actuating such brake-bars, substantially as set forth.

7. The combination with a platform-truck and its supporting-wheels, of brake-bars at opposite sides of the upper portion of the wheel, springs for applying the brake-bars and a lever for separating such brake-bars and relieving the wheels, substantially as specified.

8. The combination with a platform-truck and the supporting-wheels, of brake-bars at opposite sides of the upper portion of the wheels, springs for applying the brake-bars and a pivoted cam-bar between the brake-bars for moving them apart, and a lever extending to each end of the platform and adapted to being acted upon by the foot for swinging the cam-bar and liberating the brakes, substantially as set forth.

9. The combination with the platform-truck having supporting-wheels, of end pieces, hinges for connecting the end pieces to the platform and upon which such end pieces can be turned down to form inclines at the opposite ends of the platform, bolts for holding the ends when turned up vertically, brackets upon the truck ends of the platform and staple-bars adapted to engage the brackets upon two trucks for connecting them together, substantially as set forth.

10. The combination with the platform-truck having supporting-wheels, of end pieces, hinges for connecting the end pieces to the platform and upon which such end pieces can be turned down to form inclines at the opposite ends of the platform, bolts for holding the ends when turned up vertically, side bars connected to the platform with their upper edges above the top of the platform for guiding the wheels of another truck that may be passed over the inclined ends and the platform, substantially as set forth.

11. The combination with the platform-truck having supporting-wheels, of end pieces, hinges for connecting the end pieces to the platform and upon which such end pieces can be turned down to form inclines at the opposite ends of the platform, bolts for holding the ends when turned up vertically, side bars connected to the platform with their upper edges above the top of the platform for guiding the wheels of another truck that may be passed over the inclined ends and the platform, springs for raising the side bars and means for retaining the side bars in position, substantially as set forth.

Signed by me this 29th day of September, 1897.

WALTER H. BEEBE.

Witnesses:
S. T. HAVILAND,
E. E. POHLÉ.